(12) United States Patent
Kirn

(10) Patent No.: US 6,643,147 B2
(45) Date of Patent: Nov. 4, 2003

(54) MODULATION TECHNIQUE FOR FLYBACK CONVERTER

(75) Inventor: Larry Kirn, West Bloomfield, MI (US)

(73) Assignee: JAM Technologies, LLC, Boston, MA (US)

( * ) Notice: Subject to any disclaimer, the term of this patent is extended or adjusted under 35 U.S.C. 154(b) by 0 days.

(21) Appl. No.: 10/167,380

(22) Filed: Jun. 11, 2002

(65) Prior Publication Data

US 2003/0012037 A1 Jan. 16, 2003

Related U.S. Application Data

(60) Provisional application No. 60/297,360, filed on Jun. 11, 2001.

(51) Int. Cl.$^7$ .............................. H02M 3/335; G05F 1/40
(52) U.S. Cl. .......................................... 363/19; 323/282
(58) Field of Search ............................. 363/19, 20, 22, 363/80, 97, 98, 21.04; 323/282, 283, 284, 285, 288, 286, 290

(56) References Cited

U.S. PATENT DOCUMENTS

| 5,422,562 A | * | 6/1995 | Mammano et al. | ......... 323/282 |
| 5,485,361 A | * | 1/1996 | Sokal | ............................ 21/17 |
| 6,304,066 B1 | * | 10/2001 | Wilcox et al. | .............. 323/282 |

* cited by examiner

Primary Examiner—Rajnikant B. Patel
(74) Attorney, Agent, or Firm—Gifford, Krass, Groh, Sprinkle, Anderson & Citkowski, PC

(57) ABSTRACT

A method of improving modulation resolution in a flyback converter by pulsewidth- and/or position-modulation of a subtractive constant current with specific timing considerations is applicable to boost or buck/boost topologies. A typical system of this type uses a pulsewidth-modulated (PWM) circuit to provide a control pulsewidth in response to an incoming data stream. The control pulsewidth is used to drive a switching device which, when energized, charges an inductor. When the switching device is released the energy stored in the inductor "flies back" through a diode into a capacitor and load resistance. According to this invention, a constant current sink, gated under control of the PWM controller, is used to improve modulation resolution through pulsewidth- and position-modulation of a subtractive constant current with specific timing considerations. In the preferred embodiment, the constant current sink is implemented using a transistor in conjunction with a resistor network. When enabled, the current sinks diverts current from the capacitor receiving the energy from the inductor through the diode. This action changes the slope of the discharge of the capacitor. The activation of the current sink is preferably centered on the discharge slope, with the duration being variable as a function of demand for the subtractive modulation in accordance with the incoming data stream. Where constant modulation resolution is not required, however, position modulation of constant current pulsewidths can be used to increase the available dynamic range.

6 Claims, 2 Drawing Sheets

US 6,643,147 B2

MODULATION TECHNIQUE FOR FLYBACK CONVERTER

REFERENCE TO RELATED APPLICATION

This application claims priority from U.S. Provisional Patent Application Ser. No. 60/297,360, filed Jun. 11, 2001, the entire content of which is incorporated herein by reference.

FIELD OF THE INVENTION

This invention relates generally to electronic flyback converters and, in particular, to a method and apparatus for improving modulation resolution in systems of this type.

BACKGROUND OF THE INVENTION

Flyback converters, incorporating an inductor to provide voltage boost and usually implemented in boost or buck/boost topologies, can be controlled in a linear fashion through a broad range using pulsewidth modulation. The resolution of this modulation, however, is limited by the minimum amount of variance available to the controlling pulse width. This is usually not problematic in systems employing analog control, but digital systems very often rely upon integer pulse increments of a fixed clock of inadequate frequency to provide the desired resolution. A need exists to improve modulation resolution in such systems.

SUMMARY OF THE INVENTION

The present invention is a method of greatly improving modulation resolution in a flyback converter by pulse width and position modulation of a subtractive constant current with specific timing considerations.

The invention is applicable to flyback converters implemented in boost or buck/boost topologies, including circuit configurations incorporating an inductor to provide voltage boost. A typical system of this type uses a pulsewidth-modulated (PWM) circuit to provide a control pulsewidth in response to an incoming data stream. The control pulsewidth is used to drive a switching device which, when energized, charges the inductor. At release of the pulsewidth, the switching device ceases sinking current into the inductor which then, in attempting to maintain its previous current, sources voltage to the anode of a diode which conducts this voltage into one terminal of a capacitor and load resistance. The second terminals of the capacitor and load resistor are connected to the positive supply rail (through another inductor). In operation, then, when the switching device is released the energy stored in the inductor "flies back" through the diode into the capacitor and load resistance.

According to this invention, a constant current sink, gated under control of the PWM controller, is used to improve modulation resolution through pulsewidth- and position-modulation of a subtractive constant current with specific timing considerations. In the preferred embodiment, the constant current sink is implemented using a transistor in conjunction with a resistor network. It will be appreciated by one of skill in the art of electronic circuit design that constant current sinks using alternative components are also possible.

When enabled, the current sinks diverts current from the capacitor receiving the energy from the inductor through the diode. This action changes the slope of the discharge of the capacitor. The activation of the current sink is preferably centered on the discharge slope, with the duration being variable as a function of demand for the subtractive modulation in accordance with the incoming data stream. Where constant modulation resolution is not required, however, position modulation of constant current pulsewidths can be used to increase the available dynamic range.

DETAILED DESCRIPTION OF THE INVENTION

Figure 1:
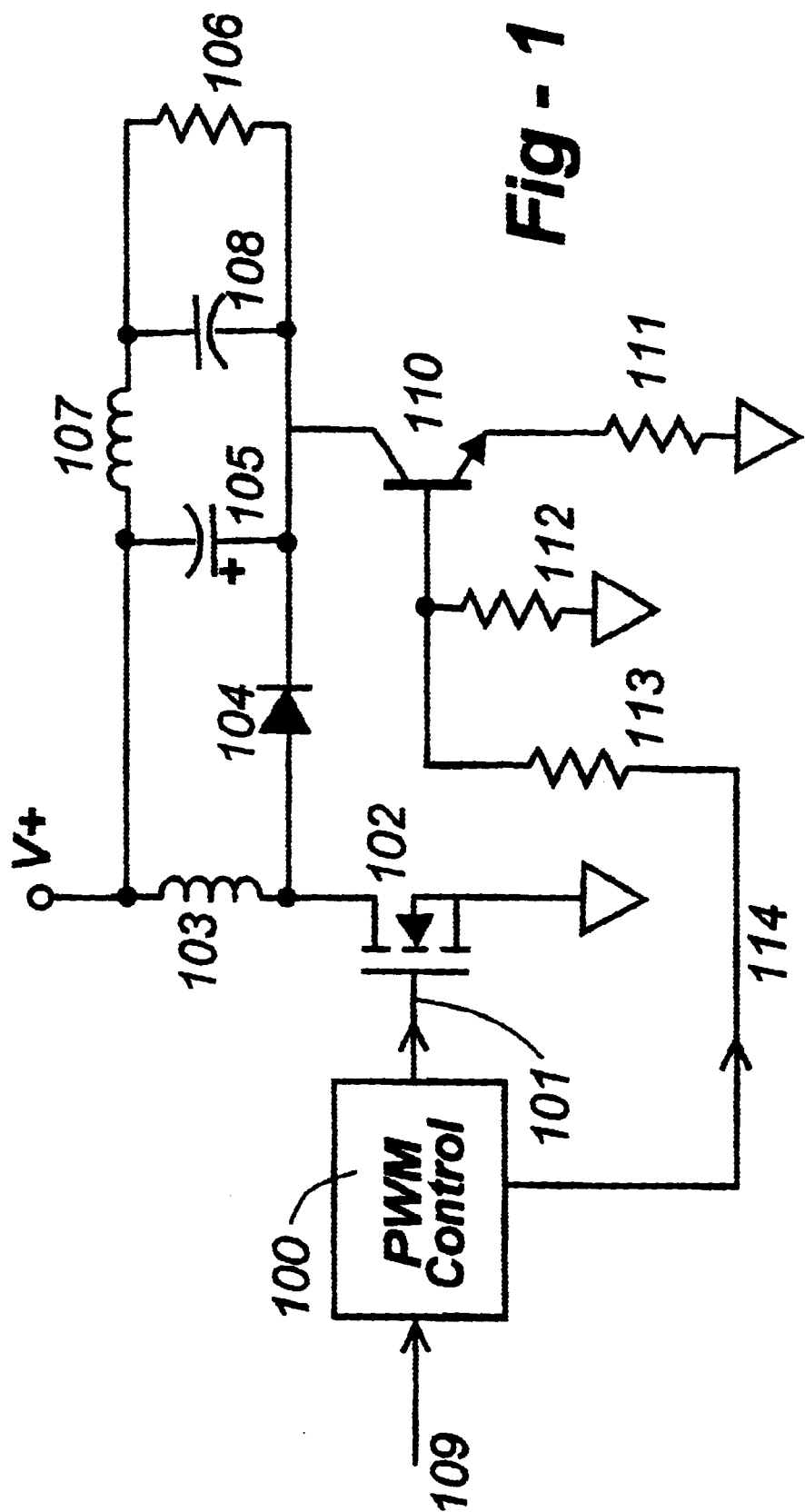
FIG. 1 is a schematic which shows a typical flyback converter in a buck/boost configuration incorporating circuitry according to this invention.

Referring now to FIG. 1, PWM Control Circuit 100 provides a control pulsewidth along path 101, under control of incoming data stream 109, to switching device 102, which, when energized, charges inductor 103. At release of pulsewidth 101, switching device 102 ceases sinking current into inductor 103, which then, in attempting to maintain its previous current, sources voltage to the anode of diode 104. Diode 104 conducts this voltage into one terminal of both capacitor 105 and load resistance 106.

The second terminals of capacitor 105 and load resistor 106 (through inductor 107) are connected to the positive supply rail. Capacitor 105 serves to limit the peak of the flyback voltage thus generated, while resistor 106 dissipates the majority of its energy. Inductor 107 and capacitor 108 serve to filter energy supplied to resistor 106. The circuitry described to this point is typical of flyback converters known in the art. However, according to the invention, transistor 110, in conjunction with resistors 111, 112, and 113 are added to form a constant current sink, gated under control of control voltage 114 from PWM Controller 100. When enabled, transistor 110 sinks current from capacitor 105.

Figure 2:
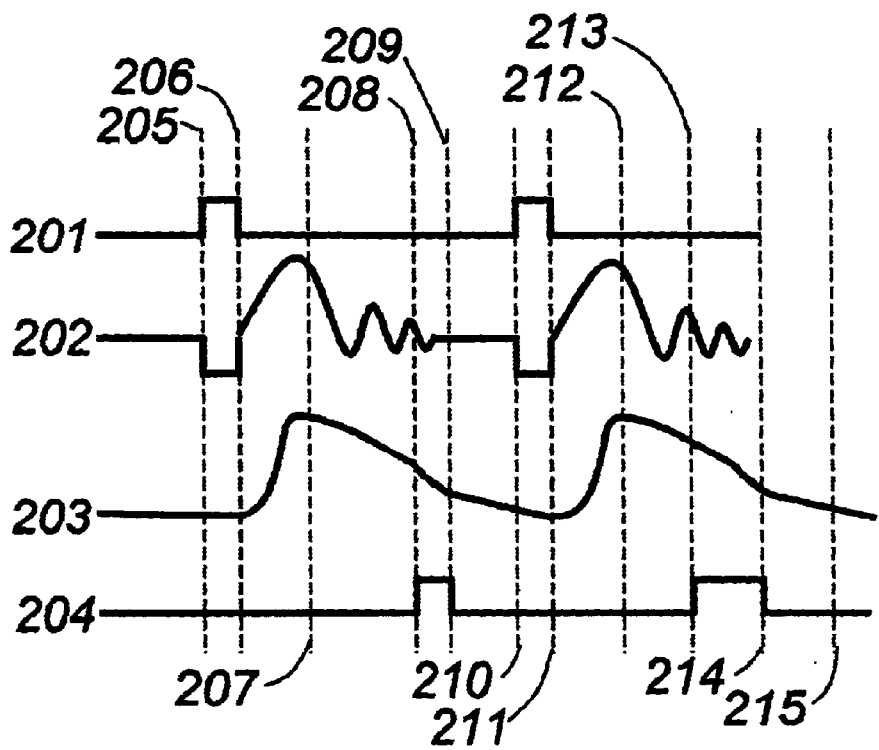
FIG. 2 is a timing diagram that shows control, as well as voltage and current waveforms of the inductor and limiting capacitor in the circuit of FIG. 1.

Referring now to FIG. 2, voltage trace 201 shows control pulsewidth 101 of FIG. 1, trace 202 shows voltage at the lower terminal of inductor 103 of FIG. 1, trace 203 shows voltage at the lower terminal of capacitor 105 of FIG. 1, and trace 204 shows control pulsewidth 114 of FIG. 1.

At time marker 205, control voltage 201 can be seen to go high, energizing switching device 102 which sinks current in inductor 103, indicated by voltage 202. At time marker 206, switching device 102 is released, at which point inductor 103 "flies back" through diode 104 into capacitor 105 and load resistance 106. This flyback action continues until time marker 207, at which point current from inductor 103 into capacitor 105 is depleted, shown in trace 202. Charge transferred into capacitor 105 is now dissipated in resistance 106, until time marker 211, at which point all charge is depleted.

At time marker 208, transistor 110 is energized by control pulsewidth 114 and sinks a constant current from capacitor 105 through resistor 111. This action can be seen by the slope change in trace 203 for the duration of transistor 110 activation, indicated by trace 204. Note that the activation of transistor 110 is preferably centered on the discharge slope of capacitor 105. Control pulsewidth indicated between time markers 208 and 209 in trace 204 is relatively short, presumably the response of PWM Controller 100 to demand for a relatively small subtractive modulation by incoming data stream 109.

From time marker 210 until marker 211, switching device 102 is again energized, resulting in the same flyback activity to time marker 212 on capacitor 105, as indicated in trace 203. In this cycle, however, a wider control pulsewidth 114, presumably issued in response to a demand for more subtractive modulation by incoming data stream 109, is output by PWM Controller 100. The pulsewidth is seen in trace 204 between time markers 213 and 214. Note that the pulsewidth issued is again centered on the discharge slope of capacitor 105, as in the previous cycle. Note also the resultant slope change between time markers 213 and 214 in trace 203, indicative of the gated constant current sink of transistor 110. It can be seen that the voltage integral available to load resistor 106 from capacitor 105 between markers 211 and 215 is then less than that available between markers 206 and 211. This is due to increased energy dissipated in resistor 111 through transistor 110.

Referring to trace 203, note that capacitor 105 is essentially linear and at two different slopes, depending on activity of the constant current sink comprised of transistor 110 and resistor 111. This constant slope is primarily due to the tendency of filter inductor 107 to maintain constant current. When a second current sink (transistor 110 with resistor 111) is added to that of inductor 107, a more pronounced (but nonetheless linear) slope is seen.

Figure 3:
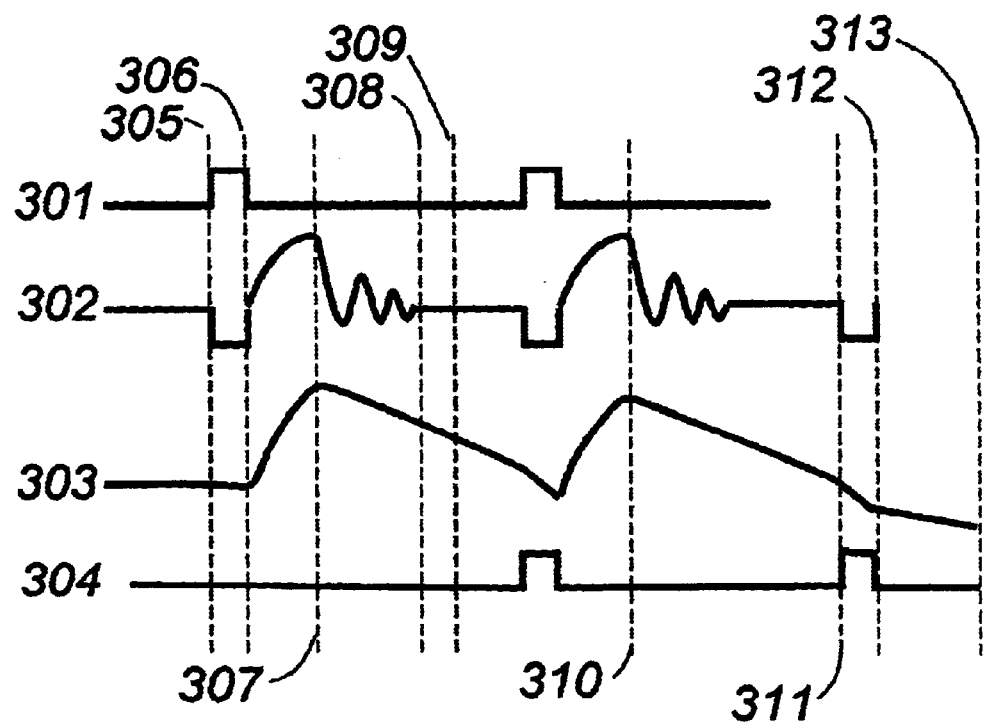
FIG. 3 is a timing diagram that shows how position modulation of constant current pulsewidths can be used to increase the available dynamic range where constant modulation resolution is not required.

Energy available to load resistance 106 can be viewed as the voltage-time integral at the lower terminal of capacitor 105. Viewed as such, it can be seen that current diverted and dissipated by external means (transistor 110 and resistor 111) early in the cycle will have greater impact on the integral than will the same current diverted and dissipated later in the cycle. This is due to the fact that action taken on the voltage remains for the duration of the integration period. Voltage integral drop (at constant load impedance) produced by a constant current sink is therefore seen to be multiplied by not only by its duration, but the time from its duration mean to the end of the integration period. In a flyback converter, subtractive modulation while the limiting capacitor is charging is highly non-linear, due to non-constant current. Constant current, due to the interaction of the limiting capacitor with the filter inductance, only occurs during capacitor discharge. Resultantly, maximum modulation range with linear scaling is achieved by fixing the mean of constant current pulsewidths at the mean of limiting capacitor discharge.

Where constant modulation resolution is not required, however, position modulation of constant current pulsewidths can be used to increase the available dynamic range. Referring now to FIG. 3, voltage trace 301 shows control pulsewidth 101 of FIG. 1, trace 302 shows voltage at the lower terminal of inductor 103 of FIG. 1, trace 303 shows voltage at the lower terminal of capacitor 105 of FIG. 1, and trace 304 shows control pulsewidth 114 of FIG. 1.

From time marker 305 until time marker 306, trace 301 indicates activation of switching device 102, resulting in energy transfer from inductor 103 into capacitor 105, from time marker 306 until time marker 307. From time marker 307 until time marker 309, capacitor 105 discharges into load resistor 106, as previously discussed. From time marker 308 to time marker 309, the constant current source comprised of transistor 110 and resistor 111 is enabled by control pulsewidth 144 from PWM Controller 100. The resultant increase in negative slope on capacitor 105 voltage can be seen here in trace 303.

From time marker 308 until time marker 309, trace 301 again indicates activation of switching device 102, with resultant energy transfer from time marker 309 until time marker 310. From time marker 311 until time marker 312, said constant current sink is again activated. Note that the duration of said second activation is equal to the previous activation between time markers 308 and 309. Note also that the activation between markers 311 and 312 occurs earlier in the time integral between markers 309 and 311 than the activation between markers 308 and 309 occurred in the time integral between markers 306 and 309. Thus occurring earlier in the time integral, a reduction in the voltage integral between markers 309 and 313 can be seen over the voltage integral between markers 306 and 309. In that the discharge rate of capacitor 105, as shown in trace 303, is constant, voltage integral modulation is linear with temporal pulsewidth position before the end of the integral period.

From FIGS. 2 and 3, respectively, it can be seen that in constant current systems, subtractive pulsewidth modulation yields diminishing reduction, and subtractive pulse position modulation yields linear reduction. It is therefore shown that simultaneous modulation of both subtractive pulse duration and position provides as well variable resolution of subtractive modulation.

I claim:

1. In a flyback converter of the type wherein a pulsewidth modulator responsive to an incoming data stream causes an inductance to charge and discharge through a capacitor coupled a load, circuitry for improving modulation resolution, comprising:
a current sink, driven by the pulsewidth modulator, to divert current from the capacitor for a predetermined period of time in accordance with the incoming data stream.

2. The circuitry of claim 1, wherein the current sink is implemented with a transistor and resistor network.

3. A method of improving modulation resolution in a flyback converter of the type wherein a pulsewidth modulator responsive to an incoming data stream causes an inductance to charge and discharge through a capacitor coupled a load, comprising the step of:
sinking a portion of the current through the capacitor for a period of time determined by the incoming data stream so as to provide variable resolution.

4. The method of claim 3, further including the step of varying the position of time period relative to the discharge slope of the capacitor.

5. The method of claim 4, wherein the current sinking period is centered on the discharge slope of capacitor.

6. The method of claim 4, wherein the positioning of the current sinking period is used to increase the available dynamic range.

* * * * *